(12) United States Patent
Campana, Jr.

(10) Patent No.: US 7,749,427 B2
(45) Date of Patent: Jul. 6, 2010

(54) EXOTHERMIC CUTTING TORCH (75) Inventor: Patsie C. Campana, Jr., Lorain, OH (US)

(73) Assignee: P.C. Campana, Inc., Lorain, OH (US)

( * ) Notice: Subject to any disclaimer, the term of this patent is extended or adjusted under 35 U.S.C. 154(b) by 350 days.

(21) Appl. No.: 11/741,209

(22) Filed: Apr. 27, 2007

(65) Prior Publication Data
US 2008/0265472 A1  Oct. 30, 2008

(51) Int. Cl.
*B23K 7/08* (2006.01)
(52) U.S. Cl. .......................... 266/49; 266/48
(58) Field of Classification Search ............... 266/48, 266/49
See application file for complete search history.

(56) References Cited

U.S. PATENT DOCUMENTS

| 3,921,542 | A | 11/1975 | Bradenberger |
| 4,114,863 | A | 9/1978 | Campana |
| 4,416,444 | A | 11/1983 | Brower |
| 4,660,807 | A | 4/1987 | Campana |
| 4,697,791 | A | 10/1987 | Henderson et al. |
| 4,787,142 | A | 11/1988 | Henderson et al. |
| 5,000,426 | A | 3/1991 | Campana et al. |
| 2008/0265472 | A1 * | 10/2008 | Campana ..................... 266/48 |

OTHER PUBLICATIONS

International Search Report and Written Opinion of PCT/US 08/58137 mailed Jun. 30, 2008.

* cited by examiner

*Primary Examiner*—Scott Kastler
(74) *Attorney, Agent, or Firm*—Rankin, Hill & Clark LLP (57) ABSTRACT A consumable thermal torch for cutting through materials includes a first elongated generally cylindrical member adapted to receive an associated supply of oxygen into a first end and react with the oxygen at a second end. A second member has a hollow profiled similarly adapted to receive an associated supply of oxygen into a first end and react with the oxygen at a second end. The second member is received radially within the first member and is substantially axially coextensive therewith. At least one first gas flow passage is formed radially between the second member and the first member. At least one second gas flow passage is formed within the hollow profile of the second member and extends from the first end of the second member to the second end of the second member.

19 Claims, 4 Drawing Sheets

EXOTHERMIC CUTTING TORCH

BACKGROUND

The present disclosure generally relates to the art of thermal torches or cutting bars and more particularly relates to consumable thermal torches or lances. The one or more embodiments described herein are particularly applicable for use in conjunction with an oxygen-fed cutting torch used for cutting, boring, burning and/or the like of hard base materials. However, it will be appreciated that the present disclosure has broader applications and may be advantageously employed in other environments and applications.

Conventional cutting torches or thermic lances are well known in the art as represented by U.S. Pat. Nos. 5,000,426; 4,660,807; 4,114,863; 4,416,444; and 3,921,542. Each of these patents generally teaches the use of a first or outer tube through which is fed an oxidizing gas such as oxygen. The oxidizing gas is ignited in any known manner. For example, an electric arc may be used to initiate the combustion process. The outer tube may receive a second or inner tube, and/or a set of consumable metallic rods. When used, gas passages are defined within the inner tube and/or between the rods and tubes to convey the oxidizing gas from a gas supply connected at one end to a combustion end of the cutting torch. The volatile nature of the combustion is used to pierce hard base materials as desired, such as cast iron, steel, concrete, or rock, for example. As the combustion process proceeds, the torch is consumed and therefore must be periodically replaced.

One factor in the design or construction of consumable cutting torches is the length of time between replacement of the cutting torches (i.e., the useful life of the cutting torch). Another factor is the effectiveness of the cutting operation. Still another factor is the expense and/or ease of manufacture of such cutting torches. All of these factors, and others, are typically considered in evaluating efficiency, performance, and effectiveness of operation of a consumable cutting torch. Still another performance characteristic that is important to consider when developing a cutting torch is the amount of "splatter" produced by the cutting torch. The cutting torch taught by the above-referenced '863 patent has been effective in reducing such "splatter" associated with a cutting operation. In particular, the tube within a tube design, having thermo rods disposed in the inner tube, has proved to be highly successful in concentrating the thermic reaction. It is believed that the inner and outer tubes define a gas envelope that confines the splatter associated with the cutting operation. As discussed in the '863 patent, the tubes can be locked against relative axial movement through the use of plural detents (a type of cooperating structure) that extend radially inward from the outer tube toward the outer periphery of the inner tube.

Notwithstanding the commercial success of previous consumable cutting torches, there is always a desire to provide improved consumable cutting torches that provide increases in efficiency, performance and/or effectiveness. Moreover, there is always a need for improved consumable cutting torches that reduce splatter. Still further, there is always a need for improved consumable cutting torches that are easier and/or less expensive to manufacture.

SUMMARY OF THE INVENTION

According to one aspect, a consumable thermal torch is provided for cutting through materials. More particularly, in accordance with this aspect, the consumable thermal torch includes a first elongated generally cylindrical member adapted to receive an associated supply of oxygen into a first end and react with the oxygen at a second end. A second member having a hollow profile is similarly adapted to receive an associated supply of oxygen into a first end and react with the oxygen at a second end. The second member is received radially within said first member and is substantially axially coextensive therewith. At least one first gas flow passage is formed radially between the second member and the first member. At least one second gas flow passage is formed within the hollow profile of the second member and extends from the first end of the second member to the second end of the second member.

According to another aspect, a consumable thermal torch is provided. More particularly, in accordance with this aspect, the consumable thermal torch includes an elongated open-ended hollow outer casing having an inlet end and a discharge end. A spiral-wrapped inner casing has an inlet end and a discharge end. The inner casing is received in the outer casing such that respective inlet and discharge ends of the outer and inner casings are generally coextensive. An outside diameter of the spiral-wrapped inner casing is less than an inside diameter of the outer casing so as to form a first gas flow passage between the outside diameter and the inside diameter that extends from the respective inlet ends to the respective discharge ends. The spiral-wrapped inner casing is loosely wrapped so as to form a second spiral-shaped gas flow passage therein that extends from the inner casing inlet end to the inner casing discharge end.

According to still another aspect, a consumable thermal torch is provided. More particularly, in accordance with this aspect, the consumable thermal torch includes an elongated open-ended hollow outer casing having an inlet end and a discharge end. An elongated open-ended hollow thin-walled inner member has an inlet end and a discharge end. The inner member is received in the outer casing such that respective inlet and discharge ends of the inner member and the outer casing are generally coextensive. The inner member has at least two circumferentially spaced radial lobes. Each of the radial lobes has a circumferentially enlarged portion in contact with the outer casing and a pair of radially extending portions extending radially inward from respective ends of the circumferentially enlarged portion and converging toward one another. A plurality of outer lobe gas flow passages is defined between the lobes and the outer casing. An open-ended hollow inner casing defines an inner gas flow passage and has an inlet end and a discharge end. The inner casing is received radially within the inner member such that respective inlet and discharge ends of the inner casing and the inner member are generally coextensive. The radially extending portions of each of the lobes contacts the inner casing to form a closed lobe gas flow passage extending axially within and along each lobe.

DETAILED DESCRIPTION

Figures 1, 2, 3:
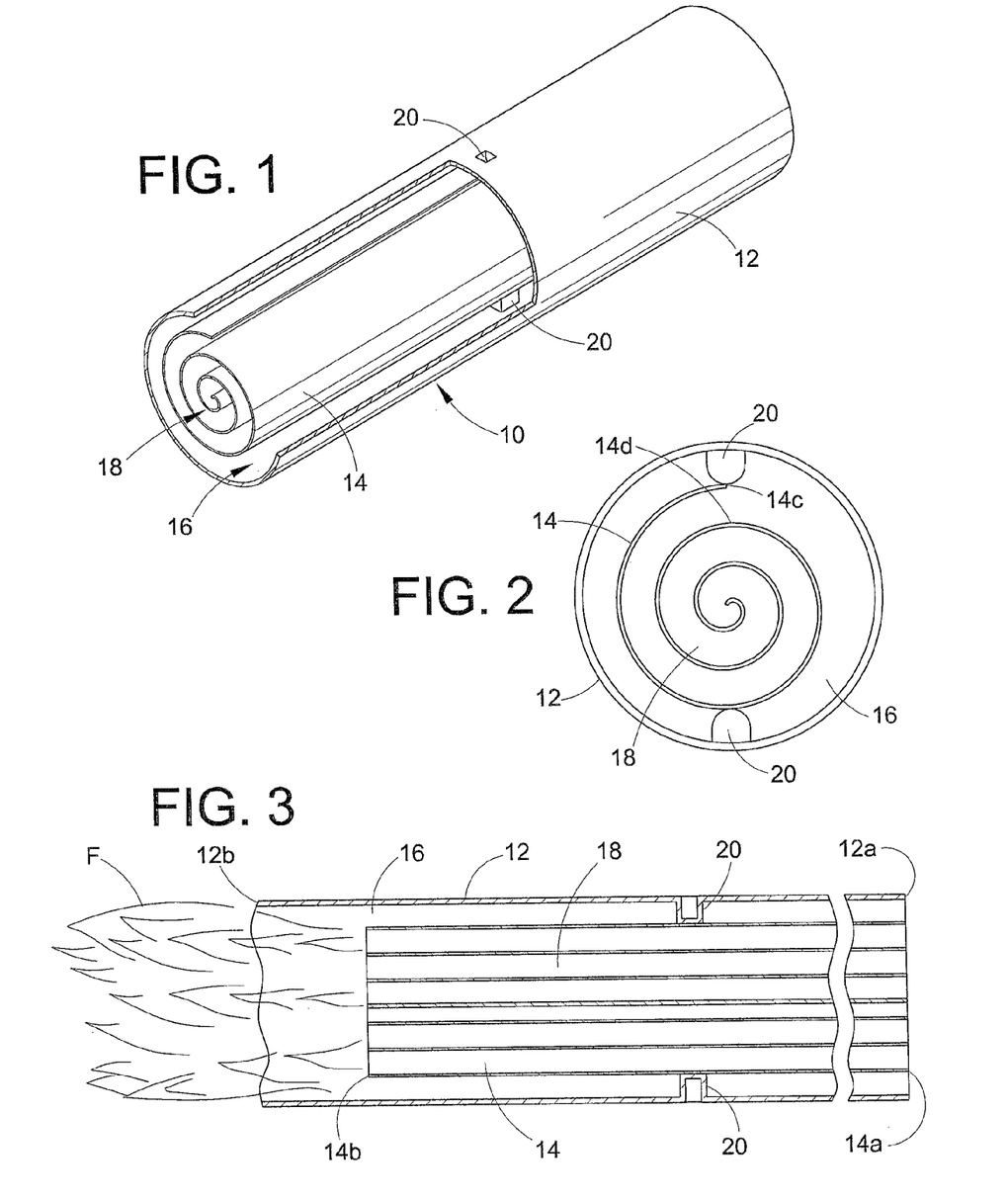
FIG. 1 is a partial cross-sectional perspective view of a consumable thermal torch having a portion cut away to show a spiral-wrapped inner casing radially received within a hollow outer casing.
FIG. 2 is a cross-sectional elevational view of the thermal torch of FIG. 1.
FIG. 3 is a longitudinal cross-sectional view of the thermal torch of FIG. 1 showing the thermal torch in operation with a flame thereof generally confined to intensify the thermic reaction achieved.

With reference to FIGS. 1-3, a consumable thermal torch for cutting through materials is shown and generally indicated by reference number 10. The torch 10 includes a first elongated generally cylindrical member 12 adapted to receive an associated supply of oxygen into a first end 12a and react with the oxygen at a, second end 12b. The torch 10 further includes a second member 14 having a hollow profile similarly adapted to receive an associated supply of oxygen into a first end 14a and react with the oxygen at a second end 14b. In the embodiment depicted in FIGS. 1-3, the second member is a spiral-wrapped inner casing. The second member 14 (spiral-wrapped inner casing in FIGS. 1-3) is received radially within the first member 12 and is substantially axially coextensive therewith. More particularly, the first or inlet end 12a of the open-ended hollow outer casing 12 is generally coextensive with the first or inlet end 14a of the spiral-wrapped inner casing 14. Similarly, the second or discharge end 12b of the outer casing 12 is generally coextensive with the second or discharge end 14b of the spiral-wrapped inner casing 14 (though, as shown in FIG. 3, the second end 14b of the inner casing 14 can be axially recessed slightly relative to the second end 12b of the outer casing 12, particularly during operation of the torch). In one application, the torch 10, and thus each of the first member 12 and the second member 14, has a length between ends 12a, 14a and 12b, 14b being anywhere from about six to about twelve feet.

At least one gas flow passage is formed radially between the second member 14 and the first member 12. More particularly, an outside diameter of the spiral-wrapped inner casing 14 is less than an inside diameter of the open-ended hollow outer casing 12 so as to form a first gas flow passage 16 therebetween that extends from the inlet ends 12a, 14a to the discharge ends 12b, 14b. At least one second gas flow passage is formed within the hollow profile of the second member 14 and extends from the first end 14a of the second member to the second end 14b of the second member. More particularly, as shown in the illustrated embodiment, the spiral-wrapped inner casing 14 can be loosely wrapped so as to form a second spiral-shaped gas flow passage 18 therein that extends from the inner casing inlet end 14a to the inner casing discharge end 14b.

In the illustrated embodiment of FIGS. 1-3, the spiral-wrapped member 14 is generally concentric within the cylindrical member 12 such that the first gas flow passage 16 has a generally annular shape defined radially between the spiral-wrapped member 14 and the cylindrical member 12. As shown in the illustrated embodiment, the second gas flow passage 18 is generally a spiral-shaped gas flow passage. As shown, the spiral-wrapped member 14 has an outer axial edge 14c radially spaced apart from an adjacent portion 14d and thus the passage 18 partially communicates with the passage 16. It is contemplated that the torch 10 could be modified such that axial edge 14c contacts or engages the adjacent portion 14d and thereby generally prevents communication between the passages 16,18.

The torch 10 can include a cooperating structure disposed radially between the inner and outer casings 12,14 for radially securing the inner casing 14 in position within the outer casing 12. As shown, the cooperating structure can be a plurality of circumferentially spaced detents 20 that extend radially inwardly from the outer casing 12 to radially lock a position of the inner casing 14 relative to the outer casing 20. More specifically, the detents 20 affix the inner and outer casings 12,14 together and additionally lock their respective inlet and discharge ends in generally coextensive relation. Although only a single set of detents 20 is shown in FIGS. 1-3, it is to be understood and appreciated by those skilled in the art that multiple sets can be employed at axially spaced intervals along the torch 10. In the illustrated embodiment of FIGS. 1-3, the detents 20 at each axial location are spaced apart from one another by approximately 180°. As will also be known and understood by those skilled in the art, the detents 20, which extend inwardly from the outer casing 12 into positive engagement with the inner casing 14, can be made by any conventional metal working techniques. The detents 20 radially secure the inner casing 14 in position within the outer casing 12 so as to form the first gas flow passage 16 with a substantially constant cross-sectional area over an entire axial extent of the torch 10. The detents 20 further maintain the inner and outer casings 12,14 in concentric relation with one another to provide the annular shape to the first gas flow passage 16.

In operation, the inlet or entrance end of the torch 10 as defined at ends 12a, 14a of casings 12,14 is affixed by convenient means to a source of oxygen as is conventional. Typically, this connection merely comprises a valve arrangement connected to an oxygen hose, regulator and cylinder or manifold so that oxygen may flow through the gas flow passages 16,18. As this specific hook up is deemed to be conventional and already known to those skilled in the art, a detailed description thereof is deemed unnecessary.

In any event, and with oxygen flowing in a direction from the inlet ends 12a, 14a to the discharge ends 12b, 14b, through gas flow passages 16,18 toward the discharge ends 12b, 14b of the torch 10, the lance or torch is ignited by conventional known means. Once ignited, combustion is self supporting through the supply of oxygen so that a flame F is directed axially outward at the discharge end of the torch onto the material being cut or otherwise processed. This flame acts to perform the boring, cutting, burning or like action desired and during such action, the entire lance structure is consumed from the discharge end toward the inlet end. Oxygen flowing through the gas flow passage 18 in conjunction with the spiral-wrapped member 14 provides the primary thermic reaction for the desired boring, cutting, burning or the like. Because the primary thermic reaction is centered at this point, the spiral-wrapped member 14 will be consumed at a slightly faster rate (FIG. 3) then will the outer casing 12.

Oxygen flowing through gas flow passage 16 exits axially outward from the discharge end of the torch to provide a gas curtain around the primary thermic reaction. The effect of this curtain is enhanced by the fact that the outer casing 12 is not consumed as fast as the remainder of the internal structural components (e.g., the second member 14) so that the gas curtain remains intact and does not spread outwardly from the torch at the point of the primary thermic reaction. The gas curtain confines the flame F and forms it into a bullet-like configuration as shown in FIG. 3 which results in an intensifying action of the flame to enhance and improve the thermic reaction. Further, and due to the fact that the flame F is confined and configured into a bullet-like structure, the thermic reaction is concentrated so as to substantially eliminate "splattering" as has been found to occur with many prior known thermal torches or lances.

As discussed in the referenced '863 patent, it has been found that the best and most efficient burn or thermic reaction will occur at 90-100 psi gauge pressure of oxygen introduced at the inlet end of the torch 10 and into the gas flow passages 16,18. The corresponding oxygen pressures developed at the discharge end of the torch 10 for these pressures are approximately 124 and 140 psi respectively, and are deemed optimal when combined with the amount of metal being consumed so that the burn is steady and extremely efficient. The above noted specific pressures allow the torch to burn freely in free air, cut deep in narrow paths very quickly and provide the best bullet-like effect for the lance. Work is accomplished faster because the thermal torch 10 melts the work piece faster, more precisely and blows molten waste out of the work area easier because of the discharge or tip pressure being developed.

Figures 4, 5, 6:
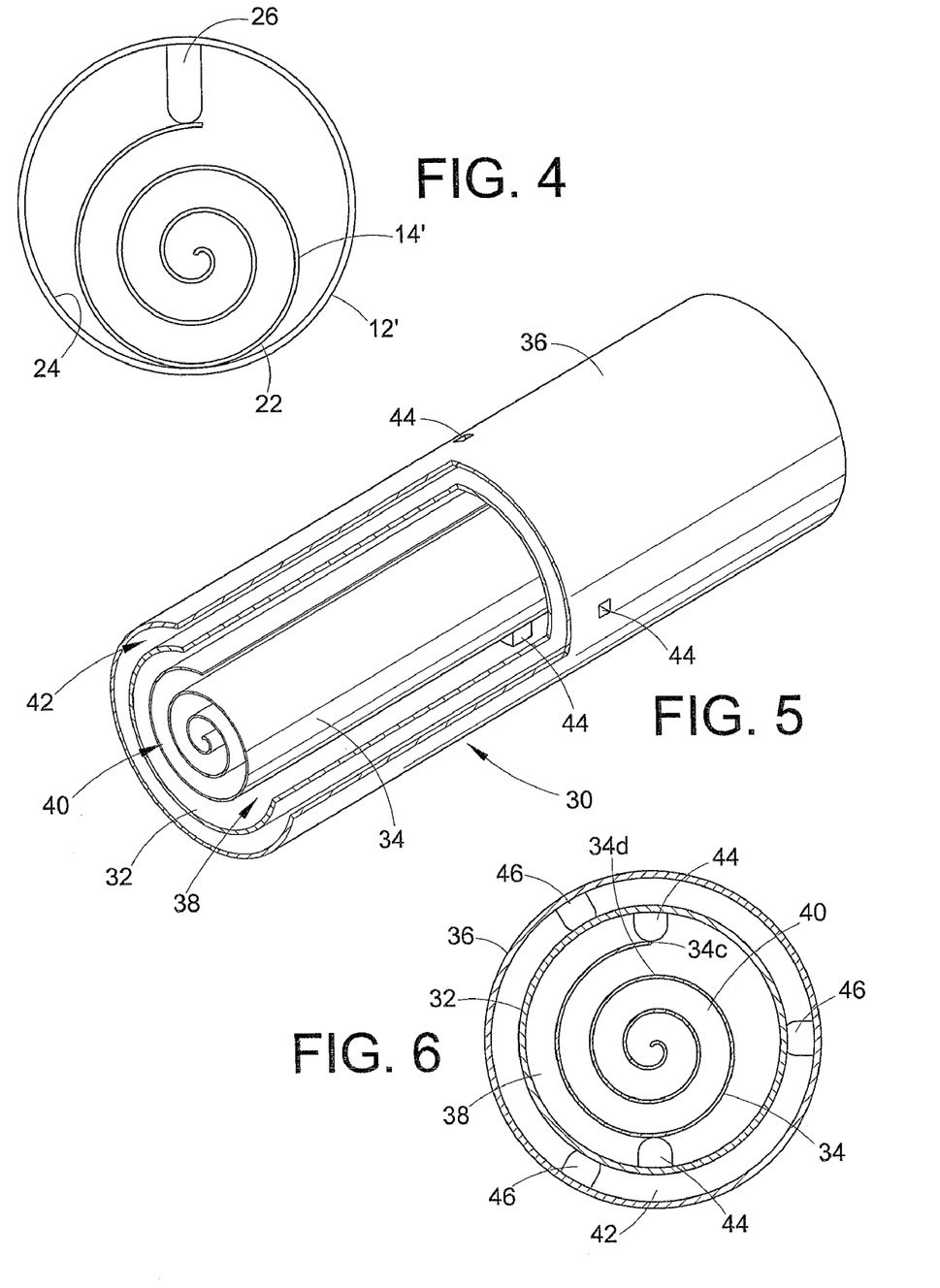
FIG. 4 is a cross-sectional elevational view of a consumable thermal torch according to an alternate construction.
FIG. 5 is a partial cross-sectional perspective view of an alternate consumable thermal torch having a portion cut away to show a spiral-wrapped inner casing received within an inner casing and an outer casing.
FIG. 6 is a cross-sectional elevational view of the thermal torch of FIG. 5.

FIG. 4 shows a slight modification to the torch 10 hereinabove described in detail with reference to FIGS. 1-3. For convenience and ease of appreciation of this modification, like components are identified by like numerals with a primed (') suffix and new components are identified by new numerals. The only difference in the arrangement of FIG. 4 and the arrangement of FIGS. 1-3 is the relative disposition between the outer and inner casings as defined by elongated bodies 12',14'. In FIG. 4, elongated bodies 12',14' are not disposed in a coaxial relationship but rather are disposed so that outer surface 22 of body 14' is in line contact with inner surface 24 of the first cylindrical member 12' over the cooperative lengths thereof. To retain the two casings 12',14' in this particular arrangement, a plurality of detents 26 are disposed at axially spaced intervals along the outer casing 12'. With only one detent employed at each axially spaced interval, the tendency of the detents is to force the inner casing 14' toward line engagement with the inner surface 24 of the outer casing 12' opposite from the detent itself. Like detents 20, the detents 26 can be made by any conventional metal working techniques. As illustrated, the inner casing 14' is radially offset within the outer casing 12' such that first gas flow passage 16' has a crescent cross-sectional shape defined between the inner and outer casings 12',14'. In all other aspects, including operation, the torch of FIG. 4 is the same or similar to the torch 10 of the FIGS. 1-3.

Figure 7:
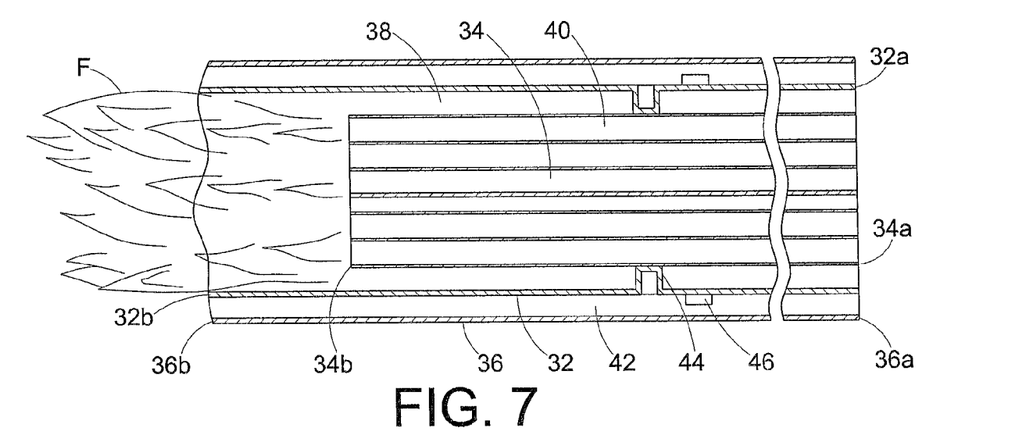
FIG. 7 is a longitudinal cross-sectional view of the thermal torch of FIG. 5 showing the thermal torch in operation.

With reference to FIGS. 5-7, a consumable thermal torch 30 is shown including an elongated open-ended hollow outer casing 32 having an inlet end 32a and a discharge end 32b and a spiral-wrapped inner casing 34 having an inlet end 34a and a discharge end 34b. The inner casing 34 is received in the outer casing 32 such that respective inlet and discharge ends of the inner and outer casings are generally coextensive. In many respects, the torch 30 is the same or similar to the torch 10 except as noted herein below. One difference between the torch 30 and the torch 10 is the inclusion in the torch 30 of a second elongated open-ended hollow outer casing 36 having an inlet end 36a and a discharge end 36b. The outer casing 32 with the spiral-wrapped inner casing 34 received therein are together received in the second outer casing 36 such that respective inlet and discharge ends (32a, 34a, 36a and 32b, 34b, 36b) of the casings 32,34,36 are generally coextensive. Like the torch 10, however, the inner casing 34 can be axially recessed slightly to form and/or facilitate a shroud effect at the torch end. Similarly, though not illustrated, the casing 32 could be slightly axially recessed relative to the casing 36.

As illustrated, an outside diameter of the spiral-wrapped inner casing 34 is less than an inside diameter of the outer casing 32 so as to form a first gas flow passage 38 between the outside diameter and the inside diameter that extends from the respective inlet ends 32a, 34a to the respective discharge ends 32b, 34b. In addition, the spiral-wrapped inner casing 34 is loosely wrapped so as to form a second spiral-shaped gas flow passage 40 therein that extends from the inner casing inlet end 34a to the inner casing discharge end 34b. Further, an outside diameter of the outer casing 32 is less than an inside diameter of the second outer casing 36 so as to form a third gas flow passage 42 between the outer diameter of the outer tube 32 and the inner diameter of the second outer tube 36 that extends from respective inlet ends 32a, 36a of the casings 32,36 to respective discharge ends 32b, 36b of the casings 32,36.

Like the torch 10, the spiral-wrapped member 34 of the torch 30 is shown housing an outer axial edge 34c radially spaced apart from an adjacent portion 34d which enables partial communication between the passages 38 and 40. In an alternate construction, the torch 30 could be modified such that the axial edge 34c contacts or engages the adjacent portion 34d and thereby generally prevents communication between the passages 38 and 40.

As illustrated, a first cooperating structure is disposed radially between the inner and outer casings 32,34 for radially securing the inner casing 34 in position within the outer casing 32. A second cooperating structure is disposed radially between the outer casing 32 and the second outer casing 36 for radially securing the outer casing 32 in position within the second outer casing 36. In the illustrated embodiment, the first cooperating structure is a plurality of circumferentially spaced detents 44 that extend radially inwardly to radially lock a position of the inner casing 34 relative to the outer casing 32. In one embodiment, as illustrated, two detents 44 are provided at opposite sides (180° apart) of the inner casing 32. As with the detents 20a, 20b of the torch 10, the detents 44 can be provided in sets disposed at spaced apart locations axially along the torch 30. Similarly, the second cooperating structure is shown to be a plurality of circumferentially spaced detents 46 that extend inwardly from the second outer casing 36 to radially lock a position of the outer casing 32 relative to the second outer casing 36. As shown, in one embodiment, the detents 46 can be provided in sets of three with the detents or each set circumferentially spaced apart an equal distance from one another about the casing 32. As with the detents 44, the detents 46 can be provided in sets disposed in axially spaced apart locations along the torch 30.

The detents 44,46 affix the casings 32,34,36 together and lock the respective inlet and discharge ends (32a, 34a, 36a and 32b, 34b, 36b) of the casings 32,34,36 in generally coextensive relation. In the illustrated embodiment of FIGS. 5-7, the detents 44 forming the first cooperating structure radially secure the inner casing 34 in position within the outer casing 32 such that the first gas flow passage 38 has a substantially constant cross-sectional area over an entire axial extent of the torch 30, and particularly is annularly shaped. Similarly, the detents 46 forming the second cooperating structure radially secure the outer casing 32 in position within the second outer casing 36 such that the third gas flow passage 42 has a substantially constant cross-sectional area over an entire axial extent of the torch 30, and particularly is annularly shaped.

In all other aspects, including operation, the torch 30 is the same or similar to the torch 10 of FIGS. 1-3.

Figures 8, 9:
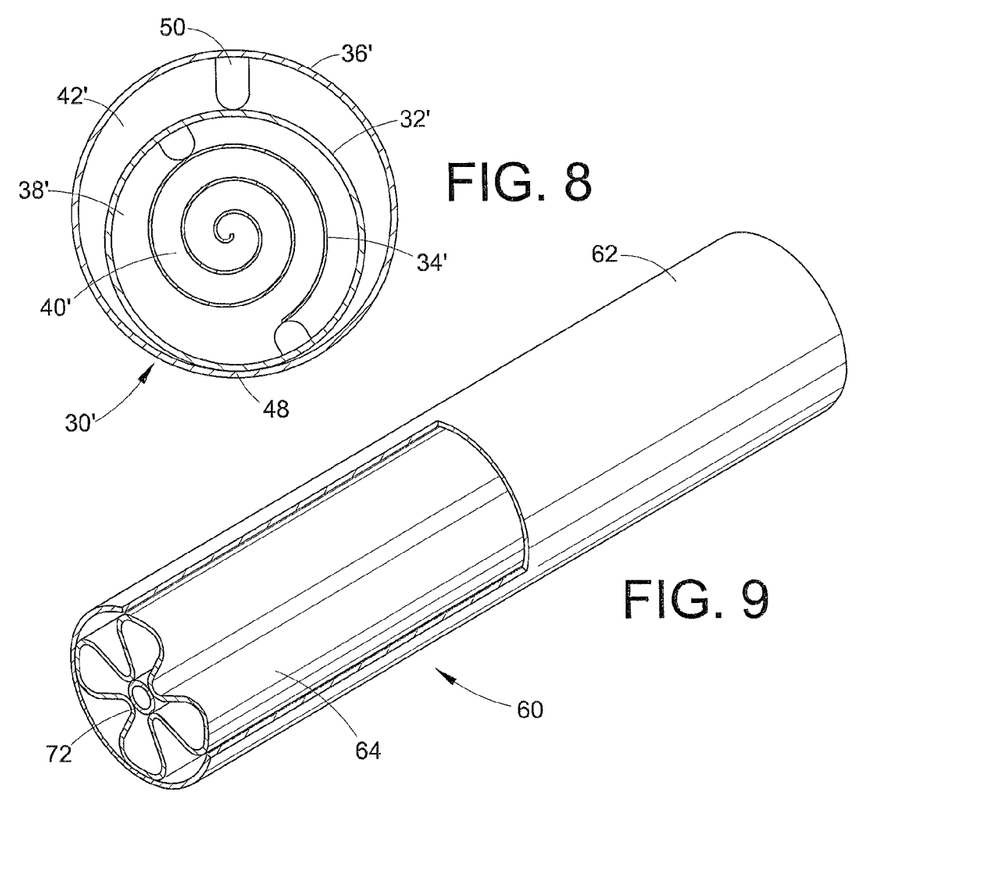
FIG. 8 is a cross-sectional elevational view of a consumable thermal torch according to yet another alternate construction.
FIG. 9 is a partial cross-sectional perspective view of another alternate consumable thermal torch having a portion cut away to show an inner member with lobes received within an outer member and a cylindrical member received radially within the inner member.

FIG. 8 shows a slight modification to the structure herein above-described in detail with reference to FIGS. 5-7. For convenience and ease of appreciation of this modification, like components are identified by like numerals with a primed (') suffix and new components are identified by new numerals. The primary difference in the arrangement of FIG. 8 and the arrangement of FIGS. 5-7 is the relative disposition between the casings 32',34' relative to the second outer casing outer 36'. Particularly, the casings 32',34' are concentric with one another but together are not concentric within the second outer casing 36'. Rather, the casings 32',34' are radially offset within the casing 36' so as to form the third gas flow passage 42' as a crescent-shaped passage. The casing 32' is in line contact with an inner surface 48 of the second outer casing 36' over cooperative lengths thereof. To retain the casings 32',34', 36' in the illustrated arrangement, a single detent 50 is radially disposed between the outer casing 32' and the second outer casing 36'. Of course, the single detent 50 can be replicated at various axially spaced positions along the torch 30'. In all other aspects, including operation, the torch of FIG. 8 is the same or similar to the torch 30 of FIGS. 5-7.

Figure 10:
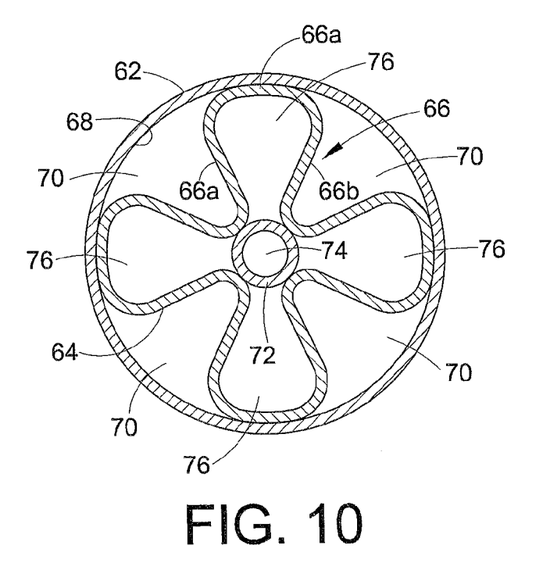
FIG. 10 is a cross-sectional elevational view of the thermal torch of FIG. 9.
Figure 11:
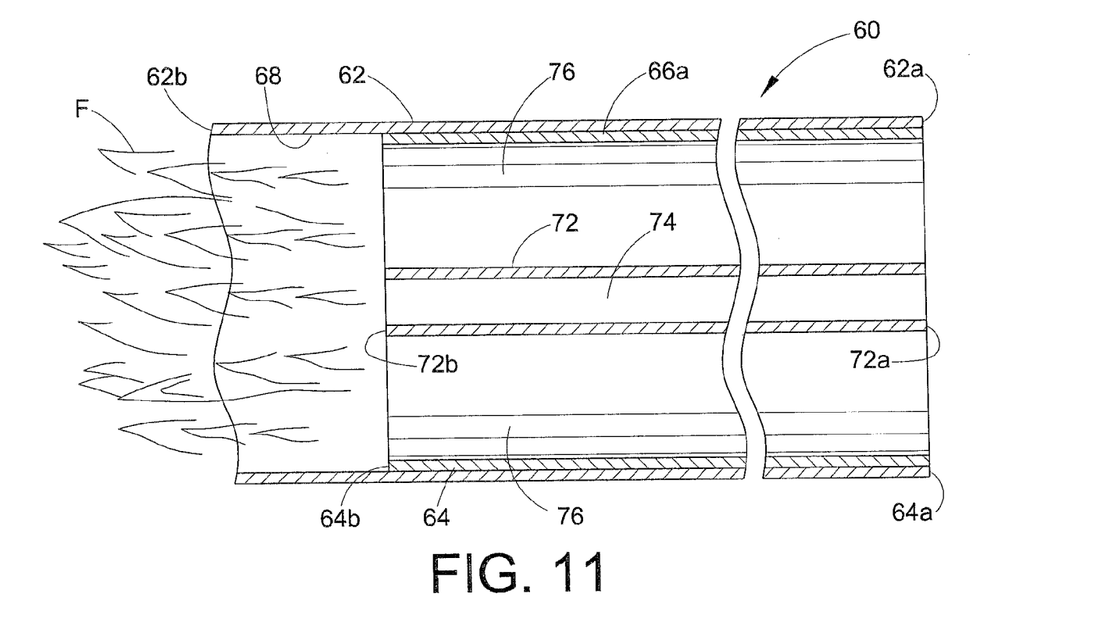
FIG. 11 is a longitudinal cross-sectional view of the thermal torch of FIG. 9 showing the thermal torch in operation.

FIGS. 9-11 illustrate yet another torch according to another alternate embodiment and generally designated by reference 60. The consumable thermal torch 60 includes an elongated open-ended hollow outer casing 62 having an inlet end 62a and a discharge end 62b. In addition, the torch 60 includes an elongated open-ended hollow thin-walled inner member 64 having an inlet end 64a and a discharge end 64b. As illustrated, the inner member 64 is received in the outer casing 62 such that respective inlet and discharge ends (62a, 64a and 62b, 64b) of the inner member 64 and the outer casing 62 are generally coextensive.

The inner member 64 has at least two circumferentially spaced radial lobes. In the illustrated embodiment, the inner member 64 includes four circumferentially spaced radial lobes 66. Each of the radial lobes 66 has a circumferentially enlarged portion 66a in contact with the outer casing 62 and particularly with an inner surface 68 of the outer casing 62. Each of the lobes 66 further has a pair of radially extending portions 66a, 66b extending radially inward from respective ends of the circumferentially enlarged portion 66a and converging toward one another as the portions 66a, 66b extend radially inward. As illustrated, a plurality of outer lobe gas flow passages 70 is defined between the lobes 66 and the outer casing 62.

The torch 60 further includes an open-ended hollow inner casing 72 defining an inner gas flow passage 74. The inner member 72 has an inlet end 72a and a discharge end 72b. As shown, the inner casing 72 is received radially within the inner member 64 such that respective inlet and discharge ends of the inner casing 72 and inner member 64 are generally coextensive. The radially extending portions 66a, 66b of each of the lobes contact the inner casing 72 to form a closed lobe gas flow passage 76 extending axially within and along each lobe 66. In most other aspects, including operation, the torch 60 is the same or similar to the torches 10,30 already described herein.

It will be appreciated that various of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A consumable thermal torch for cutting through materials, comprising:
   a first elongated generally cylindrical member adapted to receive an associated supply of oxygen into a first end and react with the oxygen at a second end;
   a second member having a hollow profile similarly adapted to receive an associated supply of oxygen into a first end and react with the oxygen at a second end, said second member received radially within said first member and being substantially axially coextensive therewith;
   at least one first gas flow passage formed radially between said second member and said first member; and
   at least one second gas flow passage formed within said closed hollow profile of the second member and extending from said first end of said second member to said second end of said second member
   said second member is an elongated open-ended hollow thin-walled member having at least two circumferentially spaced radial lobes, each of said radial lobes having a circumferentially enlarged portion in contact with said first member and a pair of radially extending portions extending radially inward from respective ends of said circumferentially enlarged portion and converging toward one another,
   said at least one first gas passage formed as a plurality of outer lobe gas flow passages defined between said lobes and said first member;
   a third elongated generally cylindrical member adapted to receive an associated supply of oxygen into a first end and react with the oxygen at a second end, said third member received radially within said second member and being substantially axially coextensive therewith,
   said at least one second gas flow passage formed as an axially extending passage through said third member and extending from said first end of said third member to said second end of said third member,
   said radially extending portions of each of said lobes contacting said third member to form a closed lobe gas flow passage extending axially along each lobe.

2. A consumable thermal torch, comprising:
   an elongated open-ended hollow outer casing having an inlet end and a discharge end; and
   a spiral-wrapped inner casing having an inlet end and a discharge end, said inner casing received in said outer casing such that respective inlet and discharge ends of said outer and inner casings are generally coextensive,
   wherein an outside diameter of said spiral-wrapped inner casing being less than an inside diameter of said outer casing so as to form a first gas flow passage between said outside diameter and said inside diameter that extends from said respective inlet ends to said respective discharge ends, and said spiral-wrapped inner casing being loosely wrapped so as to form a second spiral-shaped gas flow passage therein that extends from said inner casing inlet end to said inner casing discharge end, and
   wherein inner casing member is a continuously loosely wrapped spiral member that defines said second gas flow passage as a spiral-shaped gas flow passage that extends from a first radial end of said inner casing to a second radial end of said inner casing, said second member having an outside diameter that is less than an inside diameter of said first member thereby defining at least one first gas flow passage radially between said second member and said first member.

3. The consumable thermal torch of claim 1 further including a cooperating structure disposed radially between said first and second members for radially securing said second member in position within said first member.

4. The consumable thermal torch of claim 1 wherein one of:
said first and second members are concentric with one another such that said at least one first passage has an annular cross-sectional shape defined radially between said first and second members; or
said second member is radially offset within said second member such that said at least one first gas flow passage has a crescent cross-sectional shape defined between said first and second members.

5. The consumable thermal torch of claim 2 further including a cooperating structure disposed radially between said inner and outer casings for radially securing said inner casing in position within said outer casing.

6. The consumable thermal torch of claim 5 wherein said cooperating structure is a plurality of circumferentially spaced detents that extend radially inwardly from said outer casing to radially lock a position of said inner casing relative to said outer casing.

7. The consumable thermal torch of claim 5 wherein said cooperating structure affixes said inner and outer casings together and locks said respective inlet and discharge ends of said outer and inner casings in generally coextensive relation.

8. The consumable thermal torch of claim 5 wherein said cooperating structure radially secures said inner casing in position within said outer casing such that said first gas flow passage has a substantially constant cross-sectional area over an entire axial extent of said inner and outer casings.

9. The consumable thermal torch of claim 8 wherein said inner and outer casings are concentric with one another such that said first gas flow passage has an annular cross-sectional shape defined radially between said inner casing and said outer casing.

10. The consumable thermal torch of claim 8 wherein said inner casing is radially offset within said outer casing such that said first gas flow passage has a crescent cross-sectional shape defined between said inner casing and said outer casing.

11. A consumable thermal torch comprising:
an elongated open-ended hollow outer casing having an inlet end and a discharge end; and
a spiral-wrapped inner casing having an inlet end and a discharge end, said inner casing received in said outer casing such that respective inlet and discharge ends of said outer and inner casings are generally coextensive, wherein an outside diameter of said spiral-wrapped inner casing being less than an inside diameter of said outer casing so as to form a first gas flow passage between said outside diameter and said inside diameter that extends from said respective inlet ends to said respective discharge ends, and said spiral-wrapped inner casing being loosely wrapped so as to form a second spiral-shaped gas flow passage therein that extends from said inner casing inlet end to said inner casing discharge end;
a second elongated open-ended hollow outer casing having an inlet end and a discharge end, said outer casing with said spiral-wrapped inner casing received therein together received in said second outer casing such that respective inlet and discharge ends of said outer casing, said second outer casing and said inner casing are generally coextensive, an outside diameter of said outer casing being less than an inside diameter of said second outer casing so as to form a third gas flow passage between said outer tube outer diameter and said second outer tube inner diameter that extends from said respective inlet ends of said outer and said second outer casings to said respective discharge ends of said outer and said second outer casings.

12. The consumable thermal torch of claim 11 further including:
a first cooperating structure disposed radially between said inner and said outer casings for radially securing said inner casing in position within said outer casing; and
a second cooperating structure disposed radially between said outer and said second outer casings for radially securing said outer casing in position within said second outer casing.

13. The consumable thermal torch of claim 12 wherein at least one of said first and second cooperating structures is a plurality of circumferentially spaced detents that extend radially inwardly to radially lock a position of one of said casings relative to another of said casings.

14. The consumable thermal torch of claim 12 wherein said first and second cooperating structures affix said inner, outer and second outer casings together and lock said respective inlet and discharge ends of said inner, outer and second outer casings in generally coextensive relation.

15. The consumable thermal torch of claim 12 wherein said first cooperating structure radially secures said inner casing in position within said outer casing such that said first gas flow passage has a substantially constant cross-sectional area over an entire axial extent of said inner and outer casings, and wherein said second cooperating structure radially secures said outer casing in position within said second outer casing such that said third gas flow passage has a substantially constant cross-sectional area over an entire axial extent of said outer and said second outer casings.

16. A consumable thermal torch, comprising:
an elongated open-ended hollow outer casing having an inlet end and a discharge end;
an elongated open-ended hollow thin-walled inner member having an inlet end and a discharge end, said inner member received in said outer casing such that respective inlet and discharge ends of said inner member and said outer casing are generally coextensive, said inner member having at least two circumferentially spaced radial lobes, each of said radial lobes having a circumferentially enlarged portion in contact with said outer casing and a pair of radially extending portions extending radially inward from respective ends of said circumferentially enlarged portion and converging toward one another, a plurality of outer lobe gas flow passages defined between said lobes and said outer casing; and
an open-ended hollow inner casing defining an inner gas flow passage and having an inlet end and a discharge end, said inner casing received radially within said inner member such that respective inlet and discharge ends of said inner casing and said inner member are generally coextensive, said radially extending portions of each of said lobes contacting said inner casing to form a closed lobe gas flow passage extending axially within and along each lobe.

17. The consumable thermal torch of claim 16 wherein said at least two circumferentially spaced radial lobes includes three lobes circumferentially spaced apart from one another an equal distance.

18. The consumable thermal torch of claim 17 wherein said at least two circumferentially spaced radial lobes includes four lobes circumferentially spaced apart from one another an equal distance.

19. A consumable thermal torch, comprising:

an elongated open-ended hollow outer casing having an inlet end and a discharge end; and a spiral-wrapped inner casing having an inlet end and a discharge end, said inner casing received in said outer casing such that respective inlet and discharge ends of said outer and inner casings are generally coextensive, wherein an outside diameter of said spiral-wrapped inner casing being less than an inside diameter of said outer casing so as to form a first gas flow passage between said outside diameter and said inside diameter that extends from said respective inlet ends to said respective discharge ends, and said spiral-wrapped inner casing being loosely wrapped so as to form a second spiral-shaped gas flow passage therein that extends from said inner casing inlet end to said inner casing discharge end, wherein said first and second gas flow passages are in communication with one another.

* * * * *